July 31, 1945.　　　　J. B. McFADDEN　　　　2,380,857
HOMOGENIZER
Filed Jan. 19, 1944　　　　2 Sheets-Sheet 2
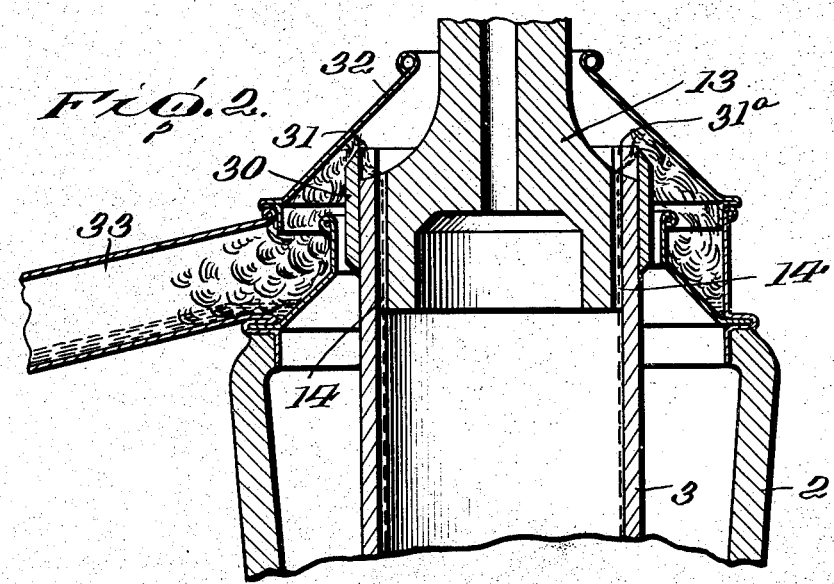
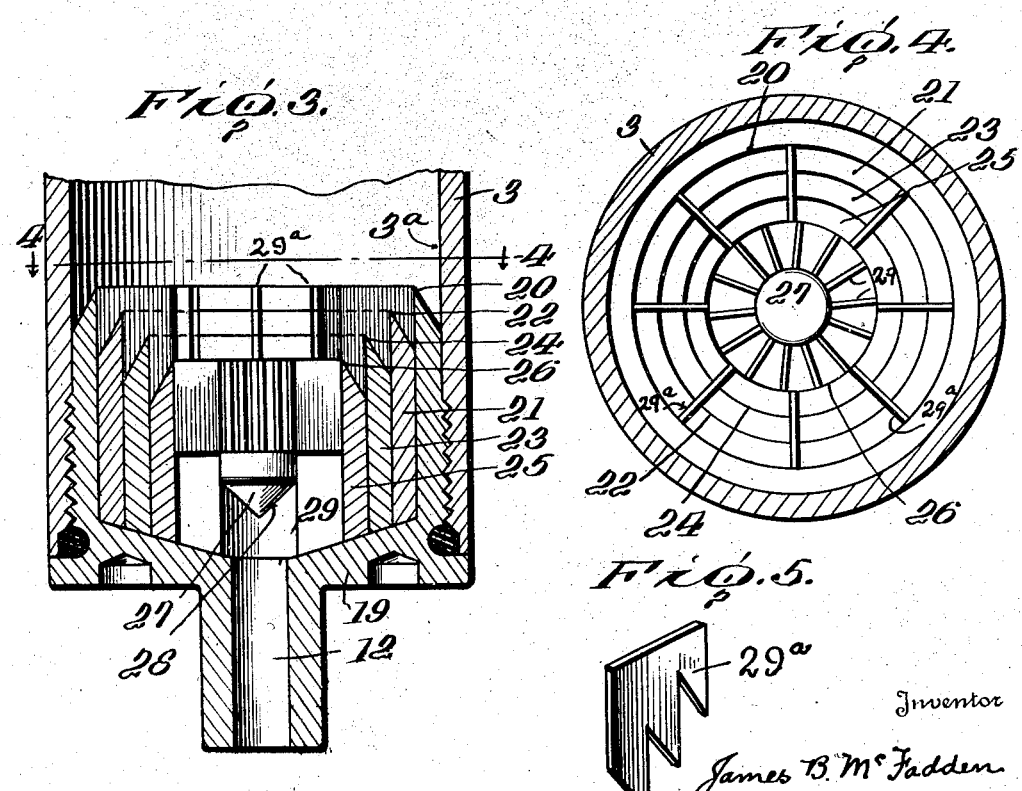
Inventor
James B. McFadden
By Mason, Porter & Diller
Attorneys Patented July 31, 1945

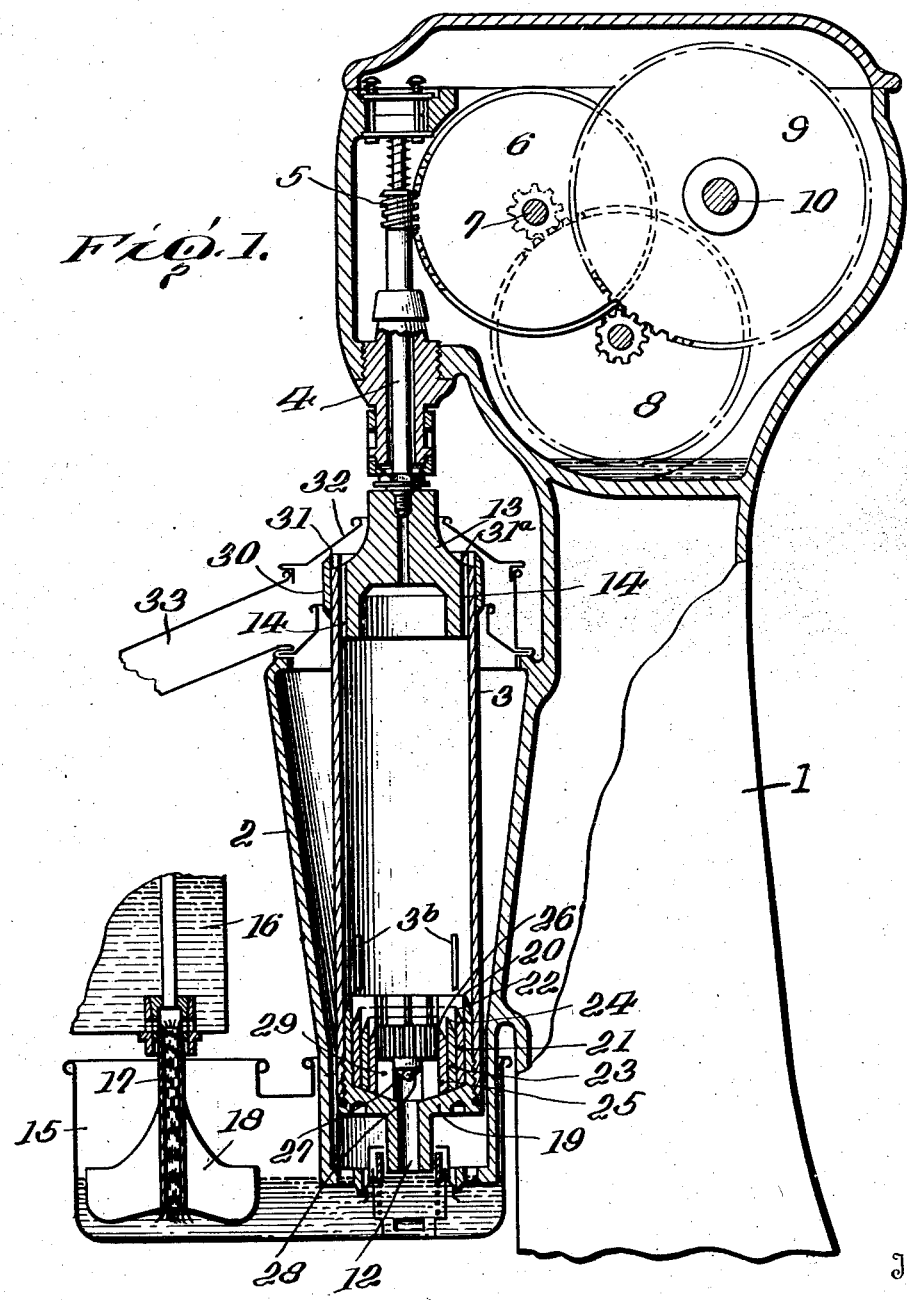

2,380,857

UNITED STATES PATENT OFFICE

2,380,857

HOMOGENIZER

James B. McFadden, West Chester, Pa., assignor to United Dairy Equipment Company, West Chester, Pa., a corporation of Pennsylvania Application January 19, 1944, Serial No. 518,901

4 Claims. (Cl. 259—96)

The invention relates to new and useful improvements in an homogenizer of the type shown in my co-pending application, Serial No. 476,347, filed February 18, 1943, wherein the liquid ingredients are homogenized by impacting the same by centrifugal force in successive steps against a hard moving surface.

An object of the invention is to provide an apparatus of the above type wherein the ingredients during impacting are moved by centrifugal force over sharp cutting edges whereby oily globules contained in the mix are ruptured and divided so as to produce a stable homogenized product.

A further object of the invention is to provide an apparatus of the above type wherein there are a plurality of sharp cutting edges operating in succession upon the ingredients of the mix being treated.

A still further object of the invention is to provide an apparatus of the above type, wherein the sharp cutting edges over which the ingredients of the mix are moved, are arranged concentrically and at different distances from the center of rotation, so that as the ingredients are moved outward from the center of rotation by centrifugal force, the flowing film will be spread out and thinned and the centrifugal force operating thereon gradually increased, and the ruptured globules will be further ruptured, and a very efficient stable homogenized product produced.

These and other objects will in part be obvious and will in part be more fully disclosed.

In the drawings, where show by way of illustration one embodiment of the invention, Figure 1 is a view partly in section and partly in side elevation of an apparatus embodying the improvements.

Figure 2 is an enlarged view in vertical section of the upper end of the bowl.

Figure 3 is an enlarged view in vertical section of the lower end of the bowl.

Figure 4 is a sectional view on the line 4—4 of Figure 3.

Figure 5 is a detail in perspective of one of the radial plates attached to the blades for causing the film to rotate with the bowl.

Referring to Figure 1 of the drawings, the apparatus includes a supporting frame structure 1. Formed integral with said supporting frame is a bowl casing 2 in which is mounted for rotation a homogenizing or emulsifying bowl 3. This bowl is supported by a spindle 4 knotted in suitable bearings in the frame. The spindle is the sole support of the bowl as the lower end of the bowl is merely guided in a collar carried by the bowl casing 2. The spindle 4 carries a worm gear 5 which meshes with a worm gear 6. This worm gear 6 is fixed to a shaft 7. The shaft 7 is driven by a suitable motor. The gear 6 rotates the gear 8 which functions to splash oil throughout the gear casing and lubricates the other gears and the ball bearing for the spindle 4. The gear 9 is driven through connection with the gear 8 and serves to operate a speed indicator disposed on the outside of the gear casing.

All of the parts mentioned are of the usual construction and further detailed description thereof is not thought necessary.

The bowl 3 at the lower end is enclosed, except for a receiving opening through which the ingredients to be homogenized pass into the bowl. The upper end of the bowl is closed by a head 13 and there are a plurality of discharge openings 14 in the head which are located in substantial alignment with the inner surface of the wall of the bowl. These discharge openings are so dimensioned relative to the inlet opening 12 as to cause a partial vacuum within the bowl by displacing a certain amount of the air therefrom. This sucks the ingredients to be emulsified into the bowl through the inlet opening 12. The ingredients are forced outwardly by centrifugal force into contact with the inner parts of the bowl moved along the inner wall of the bowl and discharged through the outlets 14.

There is a feed cup 15 associated with the lower end of the casing 2. The liquid ingredients to be homogenized, hereinafter referred to as the mix, are fed from a mixing tank 16 through a control valve 17 carried by a float 18. The ingredients are placed in the tank and are heated so as to facilitate the mixing and pasteurizing of the same. The float insures that the feed cup shall contain sufficient of the mixed ingredients so that the lower end of the casing 2 extends into and below the surface of the mix in the feed cup. This enables the bowl as it rotates to draw in by suction a uniform amount of mix to be emulsified, determined by the speed of the bowl, and the size of the inlet and outlet openings.

The bottom end of the bowl is closed by a head 19 and the inlet opening 12 is located centrally of this head. This opening is dimensioned so that it is spaced away from the inner wall 3a of the bowl. The bottom head has a threaded connection with the bowl and can be easily removed for the purpose of cleaning the interior of the bowl. Said head within the bowl is in sleeve-form and projects inwardly above the threaded connection, terminating at its upper end in a sharp cutting edge 20. The inner wall of the sleeve leading to the cutting edge 20 is parallel with the axis of rotation of the bowl, and the outer wall is inclined downwardly.

Located within this outer sleeve is a sleeve 21 which is similarly constructed so as to provide a sharp cutting edge 22. Located within the sleeve 21 is a sleeve 23 shaped so as to provide a similar cutting edge 24 and located within the sleeve 23 is an inner sleeve 25 which is likewise shaped so as to provide a similar cutting edge 26. Within this sleeve 25 is a spreader head 27 which is of smaller diameter than the sleeve and which has a cone-shaped under-face indicated at 28. Between this spreader head and the sleeve are radial wings or partitions 29.

Also attached to the sleeves carrying the sharp edges over which the ingredients are ruptured, are wings 29a which serve to cause the film impacted against the inner wall of these members to rotate with the bowl. These members 29a are shaped so as to fit the inclined and vertical edges of the sleeves and fill the spaces therebetween. These wings 29a are welded or otherwise secured to the sleeves.

There are ribs 3b extending lengthwise of the inner wall of the bowl, which serve to cause the film on the wall to move with the wall.

The upper end of the bowl 3 is provided with a collar 30 which is rigidly secured to the bowl and rotates therewith. This collar terminates at its upper end in a sharp cutting edge 31, the inner face of which is parallel with the axis of rotation of the bowl and the outer face is inclined downwardly. Associated with the collar 30 is a series of vertical ribs 31a which serve as impelling blades which keep the liquid up to the speed of the sleeve over the edge of which it is discharged.

A cover plate 32 is fixed to the casing 2 and is disposed close to the cutting edge 31. A spout 33 is associated with the cover plate 32.

The apparatus described above is particularly adapted for homogenizing oily substances and watery products, such as a skim milk product (dehydrated skim milk), fresh unsalted butter and water, which ingredients when properly proportioned and thoroughly homogenized, produce a product having all of the characteristics of natural whole milk or natural cream.

The action of the homogenizer on such a mix will be briefly described. The ingredients to be homogenized are placed in the mixing tank and are heated, preferably to a temperature sufficient to pasteurize the mix and expand or rarify the butter fat globules constituting the butter content of the mix. The mix then passes through a valve into the feed cup, and from the feed cup it is drawn by suction into the homogenizing bowl. As the mix is sucked into the bowl, it contacts with the cone-shaped end 28 of the spreader and is forced outward radially of the head between the wings 29. These wings will cause the ingredients to rotate with the bowl, and they will be impacted by centrifugal force against the surface of the inner sleeve 25. The ingredients will form into a flowing film which will creep up the inner wall of the sleeve 25 and move across the sharp cutting edge 26. The flowing film will be thrown from this cutting edge so that it breaks into a spray form and contacts with the inner surface of the sleeve 23. This impacting of the mixed ingredients, and in particular the globules of butter fat against the wall of the sleeve will rupture some of the globules, but the cutting edge over which the globules are released will disrupt the globules to a much greater extent. It will cut them, shave them and break them into smaller globules. The flowing film of ingredients will then creep up the wall of the sleeve 23 and will be released over the cutting edge 24, impacting against the inner face of the sleeve 21, then creeping along said face, where they are released over the cutting edge 22 and against the inner face of the sleeve formed as a part of the bottom head.

Here again, they will creep up the inner face of said sleeve and be released over the cutting edge 20 against the inner face 3a of the wall of the homogenizer. It will be noted that these cutting edges are spaced progressively outward from the center of the bowl and will gradually increase in circumferential area, which enables the film as it moves outward from the center to spread out and thin out, which greatly increases the rupturing of the globules as they pass over successive cutting edges.

Furthermore, as the globules move out from the center, the centrifugal force acting thereon increases so that before the fat globules are released from the last sharp cutting edge, they have been ruptured and again ruptured until they are reduced to such a small relative size that the entire product becomes thoroughly homogenized and very stable. The film of ingredients will pass along the inner wall of the bowl 3a to the upper end thereof, and during this travel along the wall of the bowl which is rotating at very high speed, the centrifugal force acting on the film will separate the foreign particles from the mix and clarify the mix. The foreign particles will cling to the wall of the bowl while the mix will pass over the same and out through the discharge openings. At the upper end of the bowl when the mixed ingredients leave the openings 14, they are impacted against the inner face of the collar 30 and are moved by centrifugal force over the sharp cutting edge 31 of the collar and again impacted against the cover.

If the centrifugal force acting on the homogenized product as it moves along the wall of the bowl during clarification tends to separate the oily products from the watery products, they will be again thoroughly homogenized and brought back into a very stable condition, as the ingredients pass from the discharge openings and across the sharp cutting edge of the collar against the cover of the bowl. The homogenized product will be collected in the spout and may be discharged therefrom onto any suitable cooling means so as to reduce the temperature of the product and prepare it for storage. The complete homogenized cooled product thus produced while having all the characteristics of natural milk has even a thinner base and better keeping qualities than natural milk. It also has the additional non-separating and sanitary features not present in natural milk.

The same ingredients as above referred to for making a milk product may also be used for making an ice cream mix by the addition of sugar, gelatine, &c.

While the invention is particularly adapted for homogenizing oily ingredients to produce a milk product, it will be understood that from certain aspects of the invention, the homogenizing may be used for emulsifying any oily substance and watery product.

It is also obvious that many changes may be made in the details of construction without departing from the spirit of the invention set forth in the appended claims.

I claim:

1. A homogenizer including in combination a rotary closed bowl having an inlet at its lower end arranged centrally thereof and outlet openings at the upper end thereof which are dimensioned so that the mixed ingredients to be homogenized will be caused to enter the inlet opening by suction, pass along the wall of the bowl and be discharged through said outlet openings, said bowl at the receiving end thereof having a series of concentric sleeves arranged one within another with each outer sleeve projecting above the adjacent inner sleeve contacting therewith, the upper ends of said sleeves having their inner faces parallel with the axis of the bowl and their outer faces inclined so as to provide a plurality of radially spaced sharp cutting edges across which the mixed ingredients are moved by centrifugal force and impacted against the inner face of the next adjacent sleeve.

2. A homogenizer including in combination a rotary closed bowl having an inlet at its lower end arranged centrally thereof and outlet openings at the upper end thereof which are dimensioned so that the mixed ingredients to be homogenized will be caused to enter the inlet opening by suction, pass along the wall of the bowl and be discharged through said outlet openings, said bowl at the receiving end thereof having a series of concentric sleeves arranged one within another with each outer sleeve projecting above the adjacent inner sleeve contacting therewith, the upper ends of said sleeves having their inner faces parallel with the axis of the bowl and their outer faces inclined so as to provide sharp cutting edges across which the mixed ingredients are moved by centrifugal force and impacted against the inner face of the next adjacent sleeve, and a series of radial ribs conforming to the upper ends of said sleeves and secured thereto for rotation therewith, said ribs being spaced from each other and serving to cause the mixed ingredients to rotate with the bowl.

3. A homogenizer including in combination a rotary closed bowl having an inlet at its lower end arranged centrally thereof and outlet openings at the upper end thereof, said bowl having associated therewith a plurality of radially spaced impacting devices successively of larger diameter against which the mixed ingredients are impacted by centrifugal force, each impacting device having the inner face thereof substantially parallel with the axis of the bowl and the outer face inclined to the axis of the bowl and intersecting the inner face at the upper end thereof to provide a sharp cutting edge across which the mixed ingredients are moved and from which the ingredients are thrown by centrifugal force and impacted against the inner face of the next adjacent impacting device, the cutting edges of said impacting devices being spaced from each other longitudinally of the bowl whereby the mixed ingredients are permitted to spread out after impact before being released and impacted against the next succeeding surface.

4. A homogenizer including in combination a rotary closed bowl having an inlet at its lower end arranged centrally thereof, and outlet openings at the upper end thereof, said bowl having associated therewith a plurality of radially spaced impacting devices successively of larger diameter against which the mixed ingredients are impacted by centrifugal force, each impacting device having an inner cylindrical surface parallel with the axis of the bowl and an outer surface which intersects the inner surface in a sharp cutting edge across which the mixed ingredients are moved and from which the ingredients are thrown by centrifugal force and impacted against the inner cylindrical face of the next adjacent impacting device, the impacting devices being successively arranged at a higher level whereby the mixed ingredients released by an inner cutting edge will contact with the cylindrical surface of the next adjacent impacting device and flow along the cylindrical surface after impact before being released over the cutting edge carried thereby and impacted against the next succeeding surface.

JAMES B. McFADDEN.